W. E. PRESCOTT.
MACHINE FOR BAKING WAFERS AND THE LIKE.
APPLICATION FILED SEPT. 5, 1914.

1,196,147.

Patented Aug. 29, 1916.
4 SHEETS—SHEET 2.

WITNESSES.
W. A. Sinden
C. A. Waller

INVENTOR
WILLIAM EDWARD PRESCOTT
by R. Walden
Attorney.

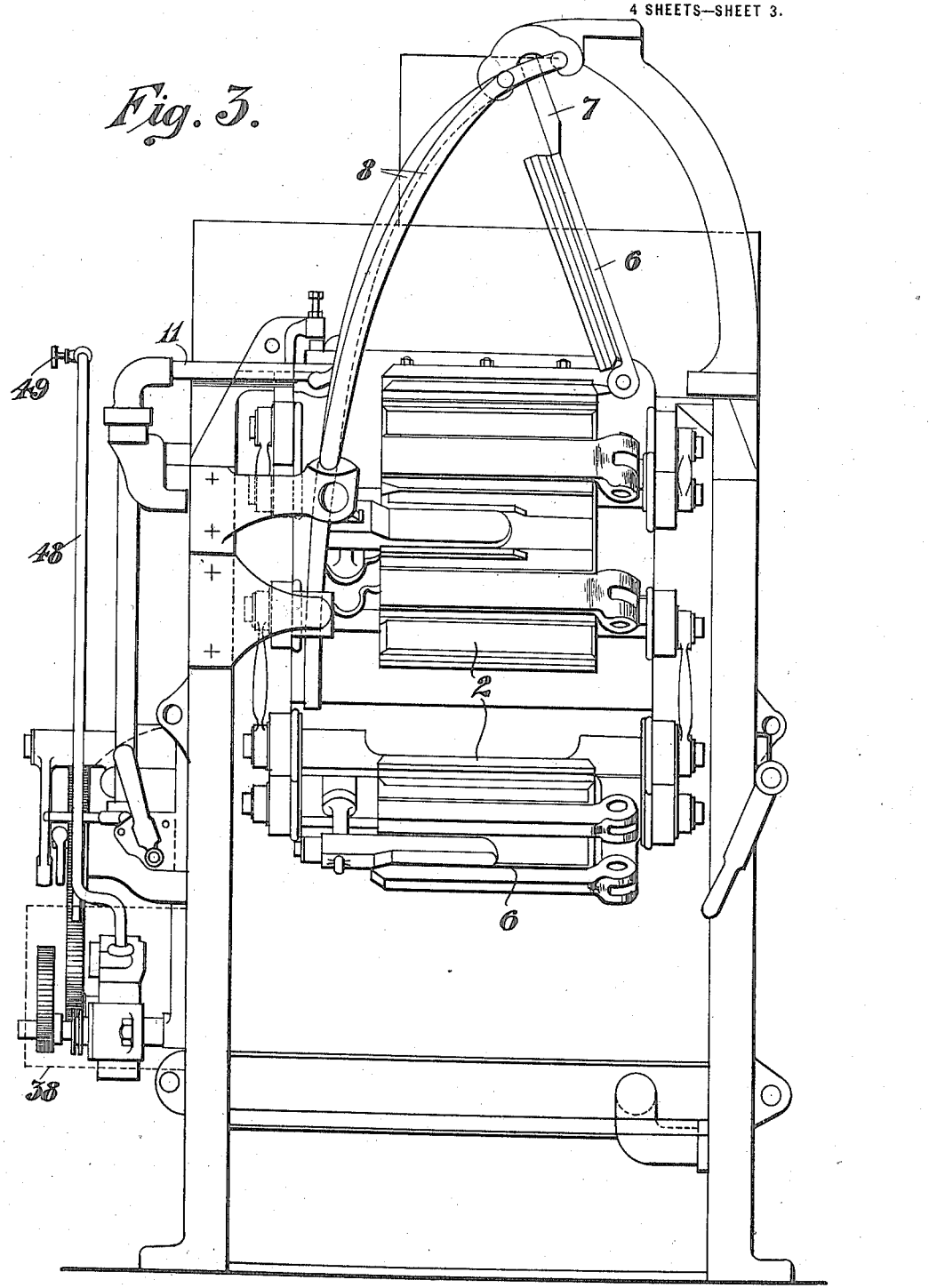

W. E. PRESCOTT.
MACHINE FOR BAKING WAFERS AND THE LIKE.
APPLICATION FILED SEPT. 5, 1914.

1,196,147.

Patented Aug. 29, 1916.
4 SHEETS—SHEET 4.

WITNESSES.
W. A. Sinden
C. A. Walter

INVENTOR
WILLIAM EDWARD PRESCOTT.
by R. Wadden
Attorney.

UNITED STATES PATENT OFFICE.

WILLIAM EDWARD PRESCOTT, OF LONDON, ENGLAND, ASSIGNOR TO JOSEPH BAKER & SONS LIMITED, OF LONDON, ENGLAND.

MACHINE FOR BAKING WAFERS AND THE LIKE.

1,196,147.  Specification of Letters Patent.  Patented Aug. 29, 1916.

Application filed September 5, 1914. Serial No. 860,470.

*To all whom it may concern:*

Be it known that I, WILLIAM EDWARD PRESCOTT, a subject of the King of England, residing at London, in England, have invented certain new and useful Improvements in Machines for Baking Wafers and the like, of which the following is a specification.

This invention relates to machines for baking wafers and the like, more particularly of that class in which the wafer material, such as batter, is pumped through a nozzle or nozzles onto the surface of molds or plates which are then closed by covers, said plates being disposed in endless fashion and fed continuously through the baking chamber after which the covers are automatically opened and the baked wafer removed.

It is the primary object of the present invention to provide means whereby the nozzle, by which the wafer material is fed to the molds, is mounted to swing about a pivot in a horizontal plane to a non-feeding position at a substantial distance from the molds completely out of the heat zone thereof in order to prevent clogging of said nozzle.

Further objects are to provide novel means for controlling or regulating the flow of wafer material to the molds, and novel means for cutting out or rendering continuous the action of the pump at will, all as will hereinafter be fully described with reference to the accompanying drawings which show sufficient of a machine of the character above set forth for comprehension of the invention and in which:—

Figure 1:
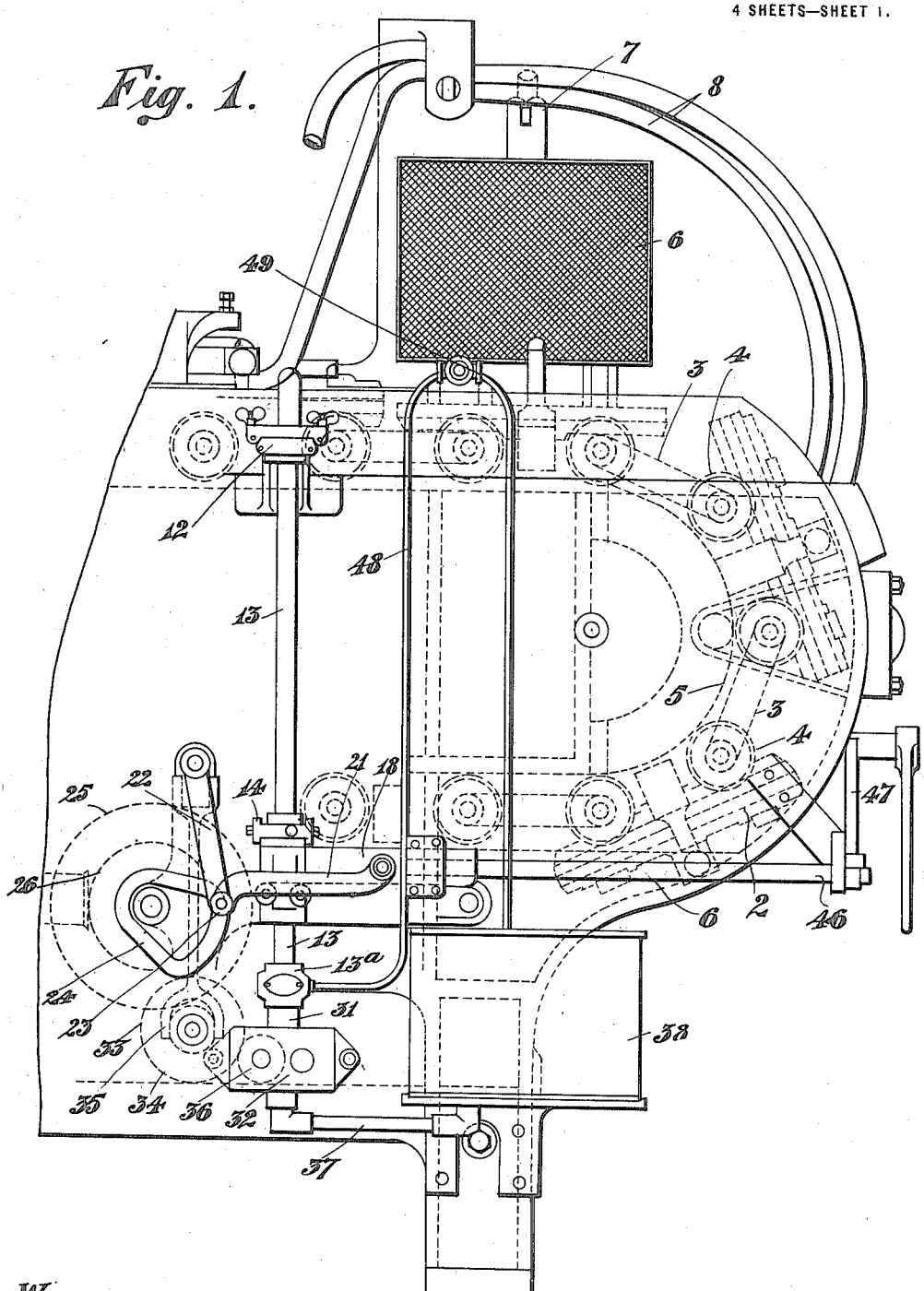
Figure 2:
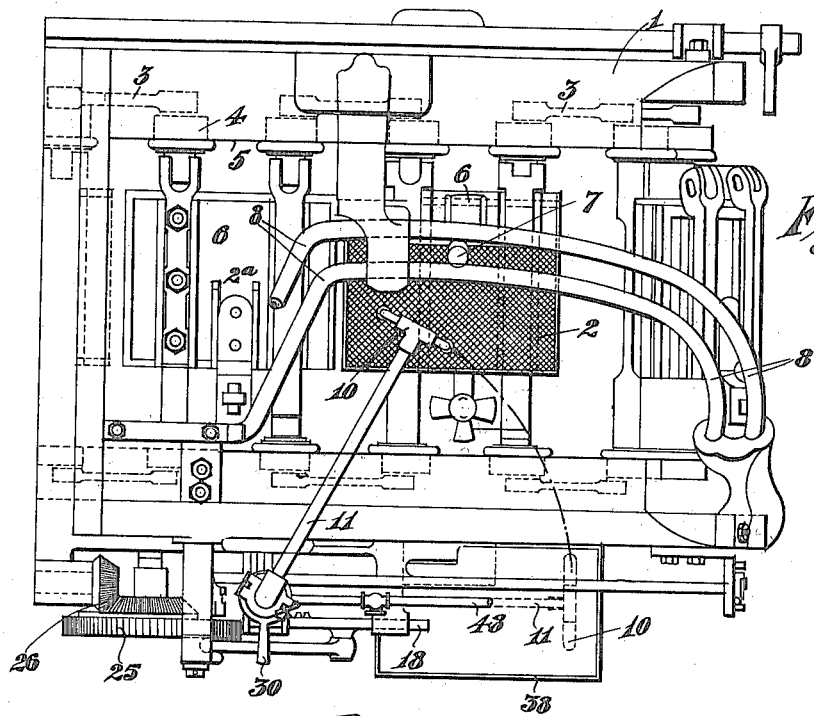
Figure 6:
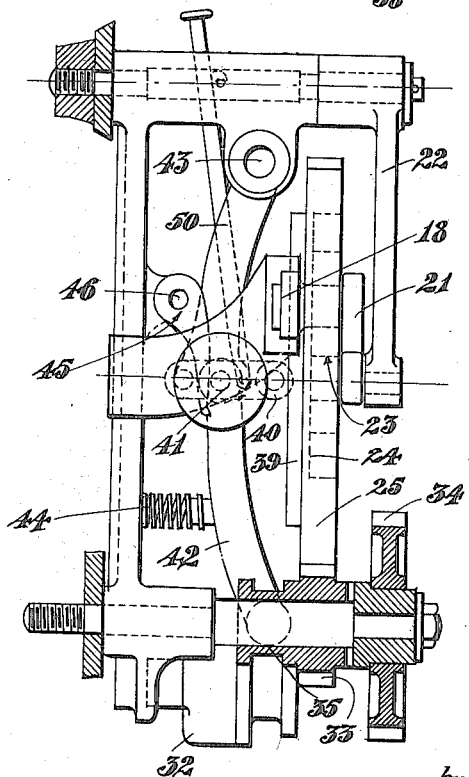
Figure 4:
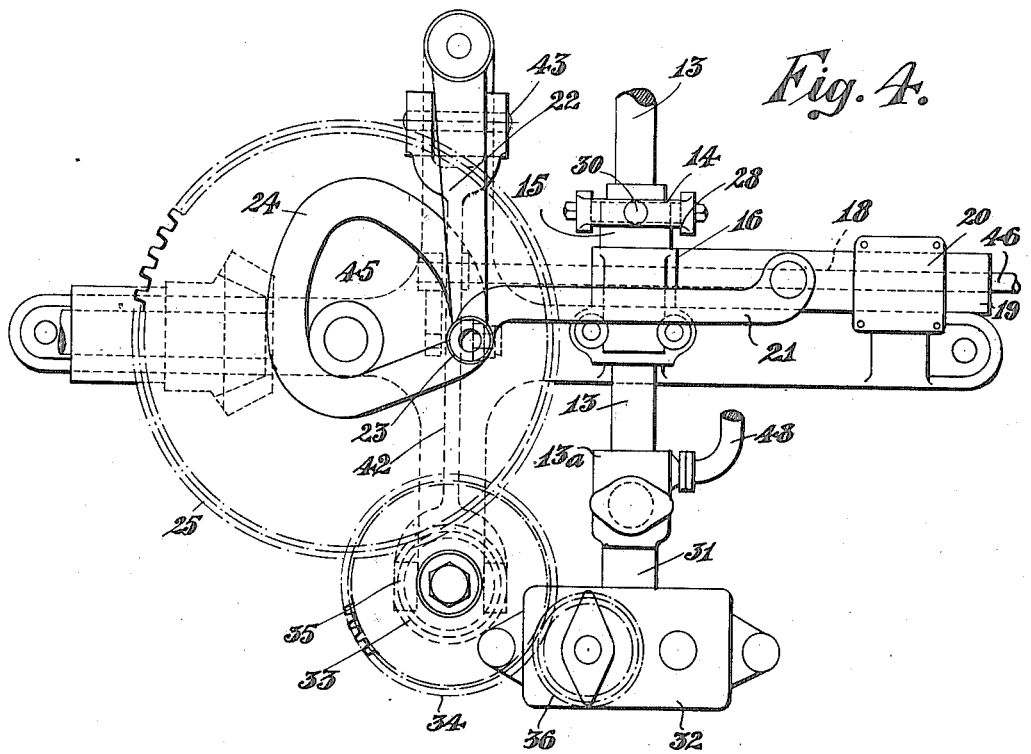
Figure 5:
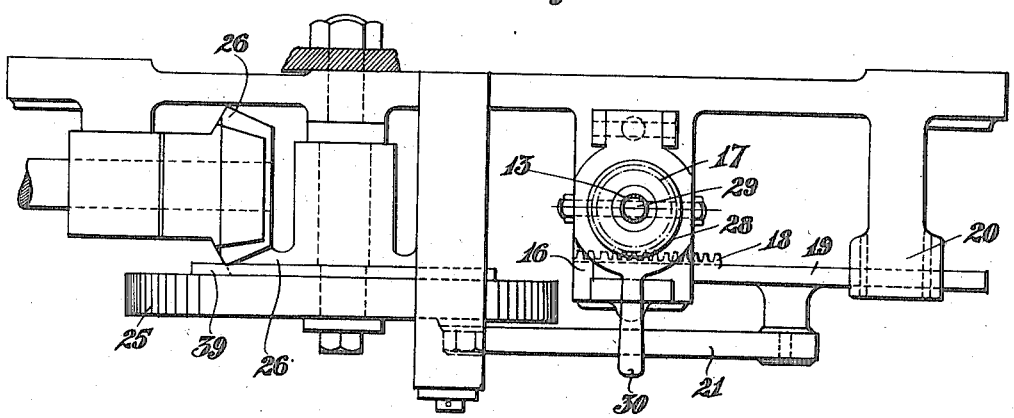

Figure 1 is a side elevation of that end of the machine to which the present invention is applied: Fig. 2 is a plan view of Fig. 1, and Fig. 3 an end elevation thereof from the right of Figs. 1 and 2. Fig. 4 is a side elevation on an enlarged scale, showing the means for actuating the nozzle and for controlling the action of the pump; Fig. 5 is a plan view of Fig. 4, and Fig. 6 an end view from the left of said Fig. 4.

Referring to the drawings between the side frames 1 of the machine there is mounted the series of molds or plates 2 which are carried by an endless chain 3 provided with rollers 4 running on a track 5, said plates being each provided with a cover 6 provided with a projection 7 which travels between curved guides 8 as the plates move toward the left in order to open and close said covers. Means for heating the molds are usually provided in devices of this character. This construction is old and well known in the art but to now turn to the features of the present invention, 10 indicates the nozzle by which wafer material is fed to the plates, this nozzle being shown more particularly in Fig. 2 as duplex and mounted on a hollow arm 11 which is adapted for movement in a horizontal plane either into the position shown in broken lines in Fig. 2 in which the nozzle is removed from the heat zone of the machine to avoid the objection above stated, or into a position over the plate 2ª in said Fig. 2 to discharge the wafer material onto said plate, the position shown in full lines being a substantially mid position between its feeding and removed positions. The movement of the arm is so controlled that it moves inward over the plate, comes to rest for a short period during which the deposit of the wafer material on the plate takes place, and then moves outward and comes to rest until required to feed again, these movements taking place in proper time relation to the movement of the plates, and the nozzle remaining over the plate for the shortest possible time consistent with the proper deposit of the wafer material.

The outer end of the arm 11 is bent downward and carried by a bracket 12 being also connected to a pipe 13 capable of rocking movement about its axis. This pipe at its lower end is provided with one member of a clutch 14 the other member of which is on a tubular part 15 mounted in a bracket 16 and provided with a pinion 17 engaged by a rack 18 carried by a slide 19 mounted in the bracket 16 and another bracket 20. The said rack is reciprocated by connecting same to one end of a link 21, the opposite end of which is carried by a lever 22 and is provided with a roller 23 working in a cam path 24 forming part of or supported by a toothed wheel 25 driven as by a suitably driven bevel gearing 26. The cam path is so shaped as to produce the movements of the pipe 13 and consequently of the arm 11 and nozzle 12 above described, and when it is desired to throw the nozzle out of action the clutch 14 is operated manually for which purpose one of its members is carried by a yoke 28 pivoted at 29 and provided with a handle 30 by operating which the pipe 13 can be disconnected from the tubular part 15.

The pipe 13 is in communication within a gland 13ᵃ with a fixed pipe section 31 forming the discharge of the pump 32 which may be of any desired kind but preferably one of the rotary type, said pump being driven from the toothed wheel 25 by means of pinions 33 and 34 with interposed clutch 35, said latter pinion 34 meshing with a pinion 36 on the pump shaft. The intake of the pump communicates by a pipe 37 with a tank 38 containing the wafer material. The pumping of the wafer material is normally intermittent, being only required when the nozzle is in position over the plate, and to insure this action the aforesaid toothed wheel 25 is provided on its inner face with a cam 39 which acts upon a roller 40 carried by a link 41 in connection with a lever 42 pivoted at 43 and engaging at its opposite end in a collar carried by the pinion 33 so that at the desired time the clutch 35 is thrown out of gear and the operation of the pump arrested. The lever 42 is under the action of a spring 44 so that the clutch is normally in gear. The pump can also be manually thrown out of action by means of a finger 45 acting on the link 41 and operated by a shaft 46 provided at the end of the machine with a handle 47, this being necessary for example in case the wafer should stick on the plate or become damaged in removal by the operator, in which case no wafer material should be pumped onto the plate in question, but the operation of the machine can proceed. Further, the pumping may be rendered continuous for example for washing out the pipes and nozzle with water or when starting up the machine as by throwing the link 41 out of action by any suitable means as a rod, shown at 50, in a manner which will be readily understood so that said link and consequently the clutch lever 42 are not acted on by the cam 39 and the pumping can continue.

The output or discharge from the pump is constant but in order to regulate the quantity of wafer material supplied to each plate at will there is provided in communication with the discharge pipe 31 a by-pass pipe 48 extending upward to the level of the arm 11, where it is provided with a regulating cock 49, and returning to the tank 38. By controlling this cock only that quantity of material required to be fed to the plate will be discharged from the nozzle the remainder returning to the tank.

The invention is not limited to the particular construction or arrangement of parts hereinbefore shown and described but may be varied within limits determined by the following claims without departing from the spirit thereof.

What I claim as my invention and desire to secure by Letters Patent of the United States is:—

1. In a machine for baking wafers or the like, the combination with a series of plates or molds mounted on an endless conveyer and movable in a horizontal plane, and means for heating said plates or molds, of a feed nozzle adapted to be swung over said plates or molds in a plane parallel thereto and to a non-feeding position at one side of said plates and completely removed therefrom, a hollow arm carrying said nozzle, a vertical feed pipe operatively connected with said arm, means for oscillating said pipe about its axis to produce the swinging movements of the feed nozzle and supporting arm, a receptacle for wafer material at a lower level than said nozzle and communicating with said feed pipe, and a pump adapted to force material from said receptacle through said feed pipe to the nozzle, substantially as described.

2. In a machine for baking wafers or the like, the combination with a series of plates or molds mounted on an endless conveyer and movable in a horizontal plane, and means for heating said plates or molds, of a feed nozzle adapted to be swung over said plates or molds in a plane parallel thereto and to a non-feeding position at one side of said plates and completely removed therefrom, a hollow arm carrying said nozzle, a vertical feed pipe operatively connected with said arm, means for oscillating said pipe about its axis to produce the swinging movements of the feed nozzle and supporting arm, a receptacle for wafer material at a lower level than said nozzle and communicating with said feed pipe, a pump adapted to force material from said receptacle through said feed pipe to the nozzle, and means for rendering the action of the pump either intermittent or continuous at will, for the purpose specified.

In witness whereof I have signed this specification in the presence of two witnesses.

WILLIAM EDWARD PRESCOTT.

Witnesses:
CARL R. LOOP,
O. J. WORTH.